(12) United States Patent
Strauss (10) Patent No.: US 6,484,709 B1
(45) Date of Patent: Nov. 26, 2002

(54) VALVE ARRANGEMENT FOR COMBUSTION SENSOR

(75) Inventor: Sebastian Strauss, Park City, IL (US)

(73) Assignee: Bombardier Motor Corporation of America, Grant, FL (US)

(*) Notice: Subject to any disclaimer, the term of this patent is extended or adjusted under 35 U.S.C. 154(b) by 8 days.

(21) Appl. No.: 09/723,859

(22) Filed: Nov. 28, 2000

(51) Int. Cl.⁷ .............................................. F02D 41/00
(52) U.S. Cl. .................... 123/679; 123/703; 123/65 R; 440/89
(58) Field of Search ............................. 123/679, 703, 123/672, 65 R; 440/89, 88; 73/116, 23.2

(56) References Cited

U.S. PATENT DOCUMENTS

| | | | | |
|---|---|---|---|---|
| 4,831,820 A | | 5/1989 | Lassanske | 60/276 |
| 4,903,648 A | * | 2/1990 | Lassankse | 123/703 |
| 5,682,870 A | * | 11/1997 | Motoyama | 123/703 |
| 5,697,353 A | | 12/1997 | Katoh et al. | 123/679 |
| 5,711,148 A | | 1/1998 | Katoh et al. | 60/276 |
| 5,712,422 A | * | 1/1998 | Kato | 73/116 |
| 5,832,907 A | * | 11/1998 | Kato | 123/672 |
| 5,836,155 A | | 11/1998 | Katoh | 60/276 |
| 5,918,275 A | | 6/1999 | Kato et al. | 73/116 |
| 5,927,247 A | | 7/1999 | Tanaka | 123/305 |
| 5,938,878 A | | 8/1999 | Hurley | 156/219 |
| 6,068,530 A | * | 5/2000 | Ozawa | 123/703 |
| 5,241,853 A1 | | 9/2002 | Tsuei et al. | 73/116 |

FOREIGN PATENT DOCUMENTS

| | | | |
|---|---|---|---|
| EP | 0719913 | 7/1996 | |
| JP | 2-294530 | * 12/1990 | F02D/35/00 |

* cited by examiner

*Primary Examiner*—Lesley D. Morris
*Assistant Examiner*—Hieu Tom Vo
(74) *Attorney, Agent, or Firm*—Fletcher, Yoder & Van Someren (57) ABSTRACT

An arrangement for utilizing a combustion sensor with an internal combustion engine. The arrangement includes a sensor mounted to the outside of an engine cylinder for communication with exhaust gasses within the cylinder via a sampling passage. A mounting structure holds the sensor proximate the sampling passage and forms a sensor chamber to receive exhaust gas therein. The sensor chamber includes a flow diverter to prevent remaining combustion particles and liquid droplets from lodging against the sensor. The chamber also includes a collection region for collecting the particles and liquid which can then be expunged through a drain outlet.

40 Claims, 8 Drawing Sheets

VALVE ARRANGEMENT FOR COMBUSTION SENSOR

FIELD OF THE INVENTION

The present invention relates generally to a system for controlling ignition characteristics of certain internal combustion engines, and particularly to a valve and mounting system for mounting a combustion sensor in direct communication with a cylinder of an engine.

BACKGROUND OF THE INVENTION

Internal combustion engines are used in a wide variety of applications, including providing power for a variety of vehicles. Generally, such engines include one or more cylinders that each contain a piston designed for movement in a reciprocating manner. Each piston is connected to a crankshaft by a connecting rod that delivers force from the piston to the crankshaft in a manner that rotates the crankshaft. Power to drive the piston is provided by igniting an air-fuel mixture supplied to the cylinder on a side of the piston opposite the connecting rod. The air-fuel mixture is ignited by some type of ignition device, e.g. providing a spark across electrodes of a spark plug.

Air and fuel may be supplied to each cylinder by a variety of mechanisms, e.g. a fuel injection system. Regardless of how the air-fuel mixture is established, it is necessary to adjust or change the air-fuel mixture according to operating conditions. For example, application of greater throttle for increased engine speed requires a greater quantity of fuel. On the other hand, maintaining the engine operation at a lower rpm, requires a lesser quantity of fuel supplied to each cylinder. Generally, greater control over combustion conditions, e.g. air-fuel mixture, provides an engine designer with a greater ability to bring about a desired engine performance under a greater range of operating conditions.

One way of obtaining greater control over combustion conditions is by sensing combustion by-products, such as exhaust gasses. Combustion condition sensors, such as oxygen sensors, can be used to detect and analyze conditions, such as air-fuel mixture, by detecting oxygen content in the exhaust gas. Proper utilization of oxygen sensors and other types of sensors dictates that external gasses, such as outside air, do not mix with the exhaust gasses prior to sensing. Additionally, many sensors are susceptible to degradation when contacted by particles or droplets of fuel and oil that remain after combustion. Accordingly, it would be advantageous to have a sensor arrangement designed to promote accurate sensing of exhaust gasses over a long duration.

SUMMARY OF THE INVENTION

The present invention features a system for sensing a combustion condition in an internal combustion engine. The system includes an engine having a cylinder defined by a cylinder wall along which a piston moves in a reciprocal manner during operation. The system further includes a sampling passage extending through the cylinder wall into fluid communication with the cylinder. A sensor is positioned to sense a combustion condition based on an outflow through the sampling passage. The system also includes an outflow diverter to limit direct exposure of the sensor to any undesirable liquids carried by the outflow.

According to another aspect of the present invention, a system is provided for sensing a combustion condition in an internal combustion engine. The system includes an engine having a cylinder defined by a cylinder wall along which a piston moves in a reciprocal manner during operation. The system also includes a sampling passage extending through the cylinder wall and a sensor position to sense a combustion condition based on an outflow through the sampling passage. The system also includes a sensor chamber positioned about an outlet of the sampling passage. The sensor chamber is defined by a chamber wall having a drain outlet therethrough.

According to another aspect of the invention, an internal combustion engine is combined with a watercraft and a combustion condition is sensed to improve operation of the watercraft. The sensor utilizes a sampling passage extending through the cylinder wall into fluid communication of the cylinder and an outflow diverter to limit direct exposure of the sensor to any undesirable liquids carried by the outflow.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

For the sake of clarity in explanation, the present invention is described in conjunction with engines that operate on a two-stroke cycle and utilize fuel injection. The present system and method are particularly amenable for use in two-stroke engines that inject fuel, such as gasoline, directly into each cylinder of the engine. The exemplary embodiment described herein should not be construed as limiting, however, and has potential uses in other types of two-stroke and four-stroke engine applications that may benefit from a control system that uniquely utilizes the sensing of combustion end products, e.g. exhaust gasses, to adjust the air-fuel mixture introduced into one or more of the engine cylinders.

Figures 1, 2:
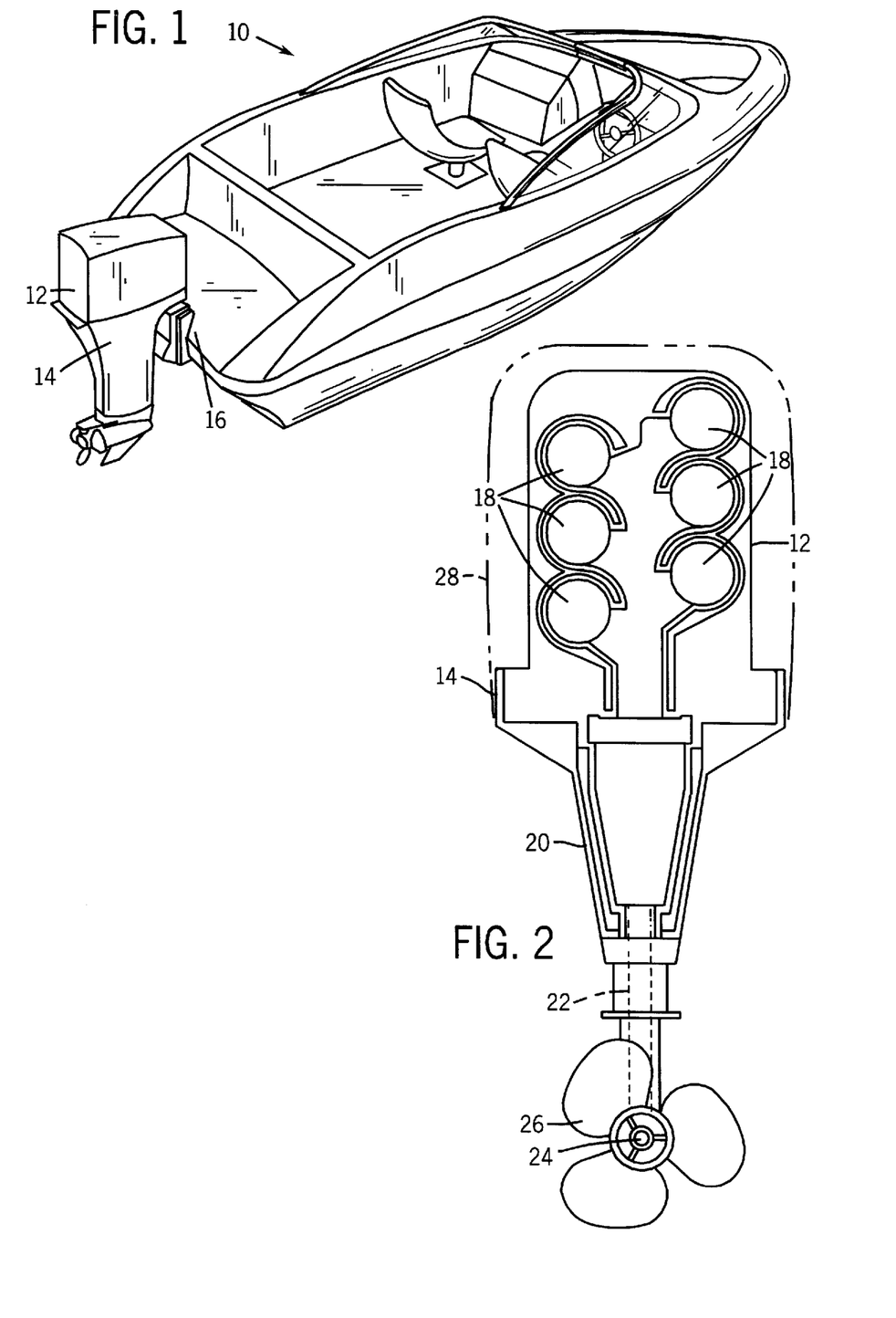
FIG. 1 is a perspective view of a watercraft powered by an exemplary engine, according to an embodiment of the present invention.
FIG. 2 is a schematic representation of the outboard motor illustrated in FIG. 1.

Referring generally to FIG. 1, an exemplary application of the present system is illustrated. In this application, a watercraft 10, such as a boat, is powered by an engine 12 disposed in an outboard motor 14. Watercraft 10 can also be a personal watercraft or boat having an internally mounted engine. In the illustrated embodiment, outboard motor 14 is mounted to a transom 16 of watercraft 10. Engine 12 is a two-stroke engine that utilizes direct fuel injection, as explained more fully below.

Although engine 12 may be a single cylinder engine, it often includes a plurality of cylinders 18, e.g. six cylinders, as illustrated schematically in FIG. 2. In the application described above, engine 12 is mounted to an outboard motor frame 20 that supports engine 12 and encloses a drive shaft 22. Generally, drive shaft 22 is vertical and connects to an output shaft 24 to which a propeller 26 is mounted. Engine 12 rotates drive shaft 22 which, in turn, rotates output shaft 24. Output shaft 24 is connected to propeller 26 by, for example, splines that rotate the propeller to drive watercraft 10 along the surface of the water. A shroud or housing 28 encloses engine 12.

Figure 3:
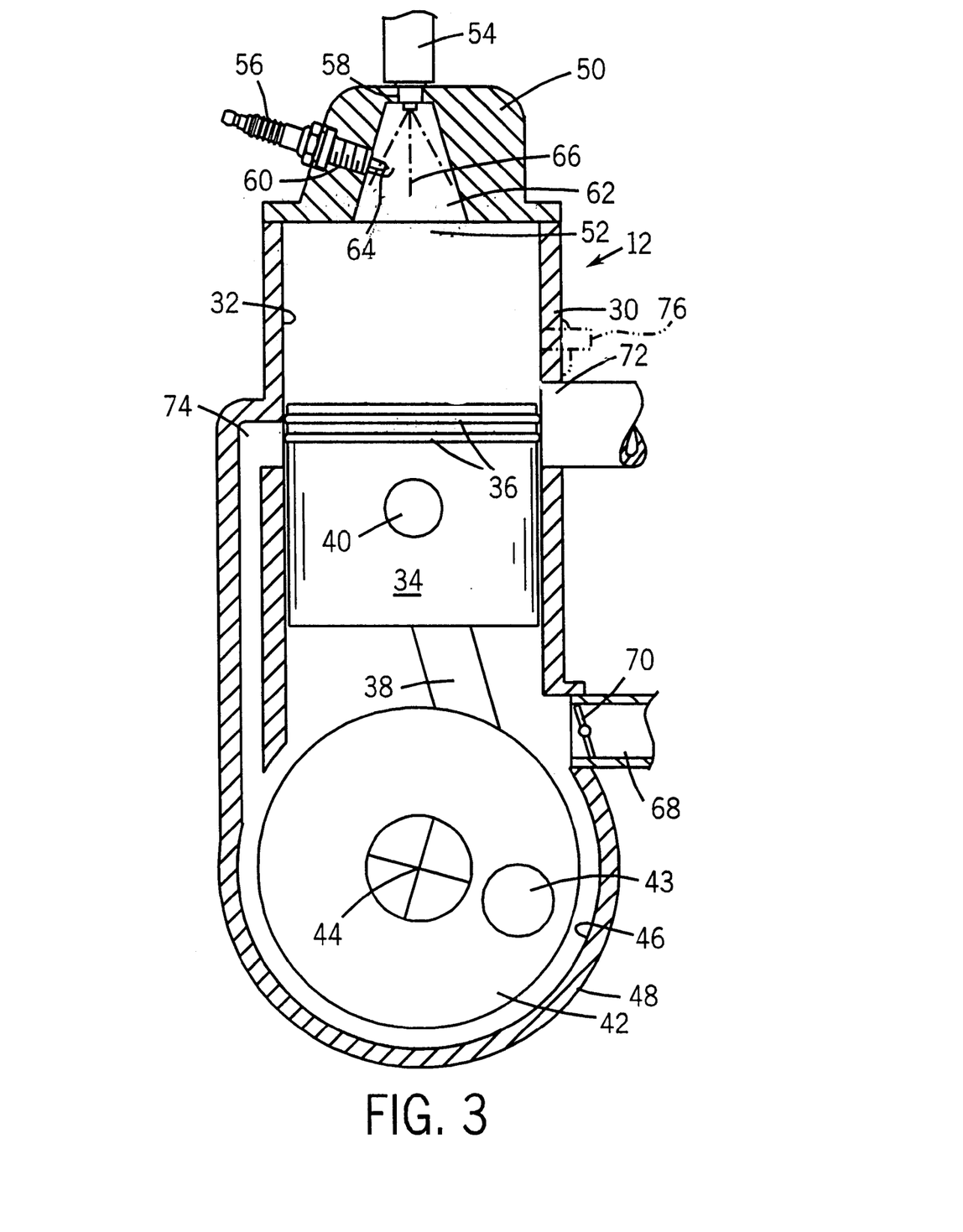
FIG. 3 is a schematic cross-sectional view of a single cylinder in an exemplary two-stroke engine having a sensor to sense a combustion condition.

Referring generally to FIG. 3, a single cylinder of an exemplary two-stroke engine 12 is illustrated. In this embodiment, engine 12 includes a cylinder 30 having an internal cylinder bore 32 through which a piston 34 reciprocates. Piston 34 typically includes one or more rings 36 that promote a better seal between piston 34 and cylinder bore 32 as piston 34 reciprocates within cylinder 30.

Piston 34 is coupled to a connecting rod 38 by a pin 40, sometimes referred to as a wrist pin. Opposite pin 40, connecting rod 38 is connected to a crankshaft 42 at a location 43 offset from a crankshaft central axis 44. Crankshaft 42 rotates about axis 44 in a crankshaft chamber 46 defined by a housing 48.

At an end of cylinder 30 opposite crankshaft housing 48, a cylinder head 50 is mounted to cylinder 30 to define a combustion chamber 52. Cylinder head 50 may be used to mount a fuel injector 54 and a spark plug 56, which are received in a pair of openings 58 and 60, respectively. Openings 58 and 60 may be formed through the wall that forms either cylinder head 50 or cylinder 30. In the illustrated embodiment, openings 58 and 60 are formed through the wall of cylinder head 50 for communication with combustion chamber 52 within a recessed internal region 62 of cylinder head 50.

By way of example, fuel injector 54 may be centrally located at the top of cylinder head 50, as illustrated in FIG. 3. Spark plug 56 preferably is disposed at an angle such that its electrodes 64, and consequently the spark, are positioned in an actual fuel spray pattern 66. Fuel spray pattern 66 is the "cone" or other pattern of fuel spray injected by fuel injector 54.

In operation, piston 34 travels towards cylinder head 50 to compress a charge of air within combustion chamber 52. Simultaneously, fuel injector 54 injects fuel to create an air-fuel mixture that is ignited by an appropriately timed spark across electrodes 64. As piston 34 travels towards cylinder head 50, air is drawn through an inlet port 68 into crankshaft chamber 46 and cylinder 30 on a side of piston 34 opposite combustion chamber 52. A valve 70, such as a reed valve, allows the air to pass into engine 12 but prevents escape back through inlet port 68.

Upon ignition of the air-fuel charge in combustion chamber 52, piston 34 is driven away from cylinder head 50 past an exhaust port 72 through which the exhaust gasses are discharged. As piston 34 moves past exhaust port 72, it ultimately exposes a transfer port 74. Air from crankshaft chamber 46 is forced through port 74 and into cylinder 30 on the combustion chamber side of piston 34. Effectively, the downward travel of piston 34 compresses the air in crankshaft chamber 46 and forces a fresh charge of air into cylinder 30 through transfer port 74 for the next ignition.

This reciprocal motion of piston 34 drives connecting rod 38 and crankshaft 32 to provide power to, for example, drive shaft 22 of outboard motor 14. To provide the desired power to crankshaft 42, it is necessary that ignition of the air-fuel mixture be carefully timed. If the ignition occurs too early, the resultant explosion works against the progress of piston 34 towards cylinder head 50. On the other hand, if ignition is too late, less power is transferred to piston 34.

Additionally, it is beneficial to optimize the air-fuel mixture introduced into a given cylinder to promote a desired result, e.g. power, efficiency of operation, reduced soot, etc. Existing fuel injection systems rely on various sensed parameters, such as throttle position, to adjust the amount of fuel injected. However, as illustrated in FIG. 3, a combustion condition sensor 76 is used to directly sense a combustion condition based on the by-products of combustion in the cylinder.

An exemplary combustion condition sensor 76 is an oxygen sensor. Oxygen sensors may be utilized in a variety of ways to determine the oxygen content of exhaust gasses resulting from combustion that occurs in a cylinder, such as cylinder 30. If no other constituents are introduced into the exhaust gasses, determination of the oxygen content can be used, for example, to determine whether the combustion that occurred had an air-fuel mixture that was stoichiometric. The oxygen sensor also can be used to determine whether the air-fuel mixture was rich or lean relative to the stoichiometric combustion mixture.

Figure 4:
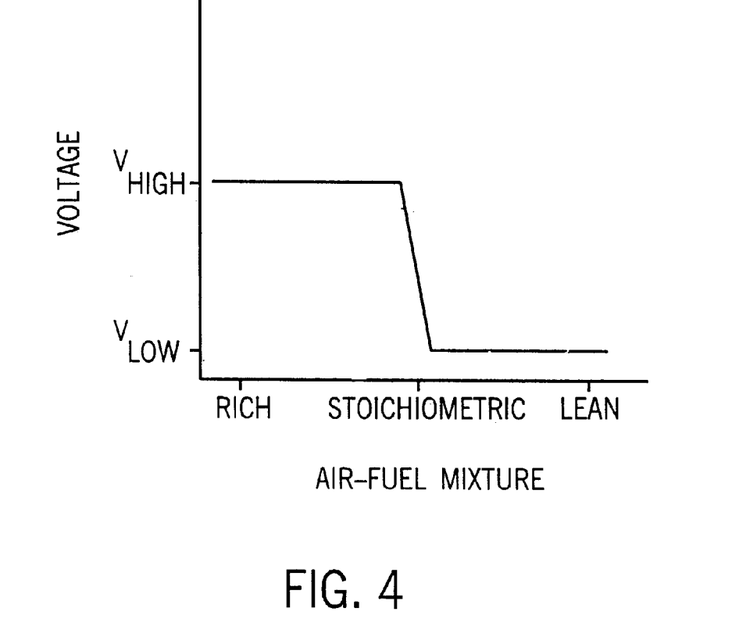
FIG. 4 is a graphical representation of the output of a passive-type oxygen sensor as the air-fuel mixture varies through a stoichiometric mixture from rich to lean.

Exemplary oxygen sensors include active sensors, which may be wide range or narrow band, and passive sensors. Active oxygen sensors output a voltage signal that increases as the air-fuel mixture becomes increasingly lean. On the other hand, passive oxygen sensors that are narrow band output a higher voltage when the air-fuel mixture is rich relative to stoichiometric, and output a low voltage signal when the air-fuel mixture is lean relative to stoichiometric, as illustrated in FIG. 4. Passive oxygen sensors tend to be substantially less expensive than active oxygen sensors, but can only be used to determine whether the air-fuel mixture is either rich or lean of a stoichiometric mixture. Although an active oxygen sensor can be utilized in the present invention, the embodiments described below utilize a more economical passive oxygen sensor, such as a zirconium oxide-type galvanic heated oxygen sensor.

The present invention allows the use of a combustion condition sensor, e.g. an oxygen sensor, in cooperation with a control system to determine a specific combustion condition in one or more cylinders and to compare this to previously mapped fuel quantities. Based on the comparison, a correction factor is determined and applied to the other cylinders of the engine regardless of whether the desired air-fuel ratio for the other cylinders is different from that of the sensed cylinder.

For example, the present control system and method is particularly amenable for use in fuel-injected, two-stroke engines, such as the direct injection engine described above. A passive oxygen sensor 76 is utilized in a single cylinder to determine whether combustion is occurring at a rich or lean mixture of fuel and air (i.e., away from a stoichiometric mixture), and then to change the fuel injection rate to trim the rich or lean mixture towards a desired mixture of fuel and air (e.g., towards a stoichiometric mixture) for that single cylinder. The air-fuel mixture may be determined by averaging over a number of engine cycles, which may vary according to operating conditions such as engine speed, throttle position, temperature, and other factors.

For the particular operating condition, the fuel injection rate actually applied to the single cylinder may be compared to a previously stored fuel map value for the desired mixture (e.g., stoichiometric). If the fuel injection rate deviates from the previously mapped value, then a correction factor may be determined to account for the deviation (e.g., a ratio between the actual and mapped fuel injection rates or amounts). Thus, the correction factor adjusts the mapped value to provide the fuel injection rate corresponding to the desired mixture for the particular operating conditions. Accordingly, the correction factor may then be applied to cylinders that do not have a sensor (i.e. non-sensed cylinders), even though the desired air-fuel mixture for those cylinders may not be a stoichiometric mixture at a given set of operating conditions.

Although a sensor 76 can be utilized in more than one cylinder, a single sensor in a single cylinder is often sufficient. For example, in the boat motor 14, a single cylinder can be sensed to determine a correction factor which is then applied to the five non-sensed cylinders as follows.

A passive oxygen sensor, e.g. sensor 76, continuously determines a specific combustion condition, e.g. a stoichiometric mixture, by continuously adjusting the fuel delivery to the sensed cylinder on a periodic basis. For example, if the sensor indicates a fuel mixture rich of stoichiometric, the amount of fuel injected is periodically decreased, until the sensor indicates the mixture is lean of stoichiometric. The amount of fuel injected is then periodically increased until the sensor indicates a fuel mixture rich of stoichiometric. This process is continuously repeated and averaged over a certain number of cycles to continuously provide the control system with an indication of the amount of fuel required to achieve stoichiometric combustion for a given set of conditions. The approximate stoichiometric mixture is determined every time the sensor indicates a transition from rich to lean or lean to rich, and the average over a given number of cycles provides an indication of stoichiometric.

Oxygen sensor 76 is best utilized during homogeneous combustion. The stratified combustion that occurs at lower engine speeds may not lend itself to accurate determination of the air-fuel mixture based on the combustion characteristics during stratified combustion. Also, the air-fuel mixture may not be sufficiently indicative of the actual combustion condition. Accordingly, the present system and methodology is particularly adaptable to engines that benefit from a skip strategy in which cylinders are individually and sequentially moved from a stratified combustion mode to a homogeneous combustion mode. This skip strategy has been pioneered by Outboard Marine Corporation and alleviates many of the problems created by soot formation in the transition from stratified combustion mode to homogeneous combustion mode without creating power surges or drops in response to small throttle movements.

By way of further explanation, the direct burning of gasoline droplets in a cylinder can cause soot formation when unvaporized gasoline is burned in the cylinder. In other words, a less desirable air-fuel mixture is formed relative to a homogeneously charged engine. At idle speeds, soot formation is not significant, because the injected fuel quantities are small, and because the fuel droplets are injected into the cylinder at a later stage of the cylinder cycle when greater pressure exists within the cylinder. As the injection timing becomes earlier and injected fuel quantities increase, soot formation can adversely impact engine operation just before the transition from stratified combustion to homogeneous combustion.

By rapidly moving a cylinder through this soot formation stage, the soot formation can be substantially avoided. However, if all cylinders of a multi-cylinder engine are simultaneously moved through the soot formation zone (e.g., by simultaneously changing the fuel injection angles over a range), then a relatively small throttle movement may rapidly change speed due to torque changes from the simultaneous movement. Accordingly, it has been determined that sequential movement of the cylinders from stratified combustion mode to homogeneous combustion mode (or vice versa) largely eliminates soot formation while providing a smooth power transition as the throttle position is increased or decreased. Preferably, oxygen sensor 76 is placed in the first cylinder to be transitioned from stratified combustion mode to homogeneous combustion mode to permit the earliest and most accurate sensing of a combustion condition, such as stoichiometric combustion during homogeneous operation.

Figure 5:
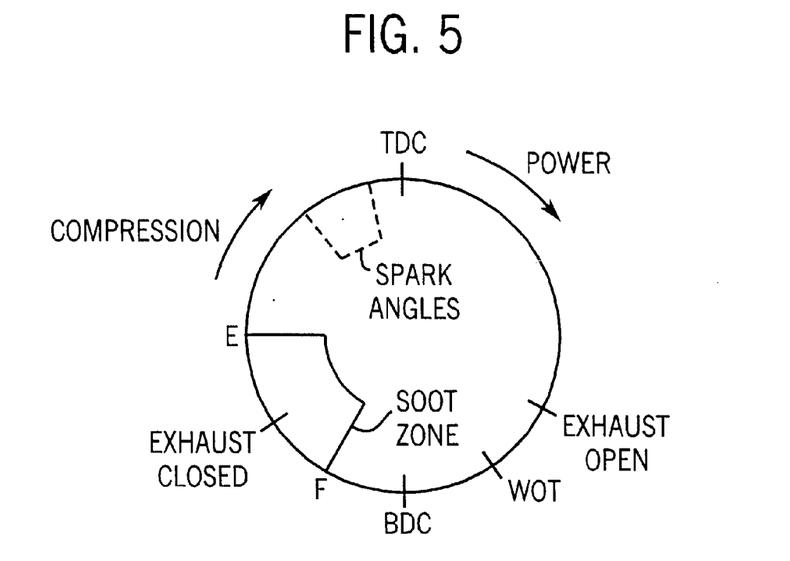
FIG. 5 is a graphical representation of a single revolution of an engine crankshaft with respect to the location of a piston in a cylinder.

FIG. 5 provides a graphical representation of one complete revolution of crankshaft 42 with respect to the location of piston 34 in cylinder 30, and further illustrates the step function control strategy described with respect to FIG. 5. Starting with piston 34 located at top dead center (TDC), piston 34 is drawn toward crankshaft 42 in a power stroke. At a predefined angle from TDC, piston 34 moves below exhaust port 72 to permit exit of the exhaust gasses. Piston 34 then reaches bottom dead center (BDC) and begins moving away from crankshaft 42. The soot zone is located at injection angles E and F (e.g., approximately 90 and 150 degrees) before top dead center (BTDC). The compression stroke then begins once exhaust port 72 is closed. Within the range of angles indicated in dashed lines as spark angles, a control unit energizes spark plug 56 to ignite the air-fuel mixture in combustion chamber 52.

An electronic control unit, described in more detail below, utilizes a map stored in memory to control fuel injection angles and spark angles based on throttle position and rpm. This control unit also stores a fuel map that controls, subject to correction based on the output of sensor 76, the quantities of fuel injected into each cylinder. In an exemplary engine at idle speed, the pistons move from TDC to BDC and back to TDC in about 100 milliseconds. At 6000 engine RPMs, the pistons move from TDC to BDC and back to TDC in about 10 milliseconds. Accordingly, the engine speed or RPM influences the angle or degrees before TDC at which fuel is injected into the cylinders, because it influences the fuel residence time needed for mixing and evaporation. For example, at wide open throttle, fuel might be injected into the cylinder at about 220 before top dead center, but as the speed of the piston decreases during throttle back, the angle at which fuel is injected also decreases.

Under the step or skip strategy, the engine fuel injection angle is controlled so that the soot zone is avoided in each cylinder. That is, the fuel injection angles for all the cylinders are the same and when the throttle position is advanced to a position corresponding to an injection angle proximate the soot zone, individual cylinders are controlled to skip through the soot zone one at a time. In accordance with the skip strategy, a first set of throttle positions provides for engine operation in a stratified combustion mode and the fuel injection angles in all the cylinders are the same. For a second set of throttle positions, the engine operates in a mixed stratified combustion mode and homogeneous combustion mode in that the injection angles in at least one of the cylinders result in stratified combustion and the injection angles in at least one of the other cylinders result in homogeneous combustion. For a third set of throttle positions, the engine operates in a homogeneous mode, and the fuel injection angles in all the cylinders are the same. This engine control strategy effectively allows individual cylinders to skip the soot zone individually or in small groups, e.g. pairs. When the oxygen sensor 76 is placed in the first individual or group of cylinders to move from stratified combustion mode to homogeneous combustion mode, appropriate correction factors can be determined as soon as possible and applied to the other cylinders, typically once they are moved into the homogeneous combustion mode.

In one embodiment, at throttle positions up to 15 percent of wide open throttle, the injection angles in all the cylinders are the same, and the engine operates in a stratified combustion mode. Upon increasing throttle position, between throttle positions of approximately 15 percent and 27.5 percent of wide open throttle, one or more cylinders are now controlled to operate with earlier injection angles and higher fueling, which results in higher torque production and lower soot formation than the soot zone (e.g., between 90 and 150 degrees BTDC). Simultaneously, the remaining cylinders operate with late injection angles and stratified low fueling, resulting in a stratified mixture of air and fuel, lower torque and also lower soot formation than the soot formation for the soot zone. One or more cylinders may be operating at one end, e.g. injection angle F of the soot zone, and the remaining cylinders may be operating at the other end, e.g. injection angle E of the soot zone. Once the throttle position is advanced beyond the skip range (e.g., 27.5 percent of wide open throttle), all cylinders once again are operated at the same fuel injection angles, and the engine operates in the homogeneous combustion mode.

Figure 6:
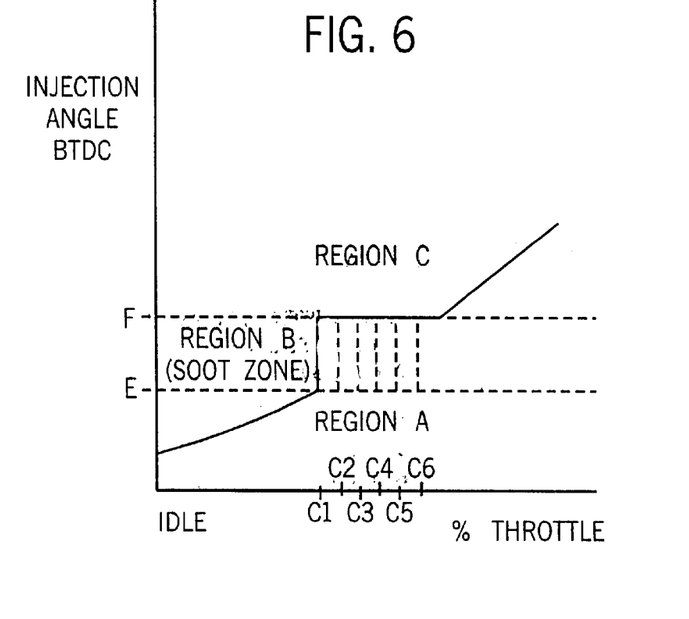
FIG. 6 is a graphical representation of injection angle before top dead center (BTDC) versus percent throttle for an exemplary engine.

Referring generally to FIG. 6, a graphical illustration of injection angle versus percent throttle is illustrated for the described injection angle skip strategy. Region A corresponds to stratified combustion, region B corresponds to mixed stratified and homogeneous combustion and region C corresponds to homogeneous combustion. Region B is where some cylinders are operating in a stratified combustion mode and some cylinders are operating in a homogeneous combustion mode without significantly increasing soot formation relative to regions A or C. Advantageously, the present technique allows for sequential skipping over injection angles corresponding to the soot zone, as illustrated in FIG. 5. For example, there may be six cylinders, such as cylinders C1, C2, C3, C4, C5 and C6, which sequentially skip over the injection angles between E and F corresponding to Region B (the soot zone). Thus, the soot zone is avoided, and the process of sequentially skipping through the soot zone ensures a smoother transition.

Figure 7:
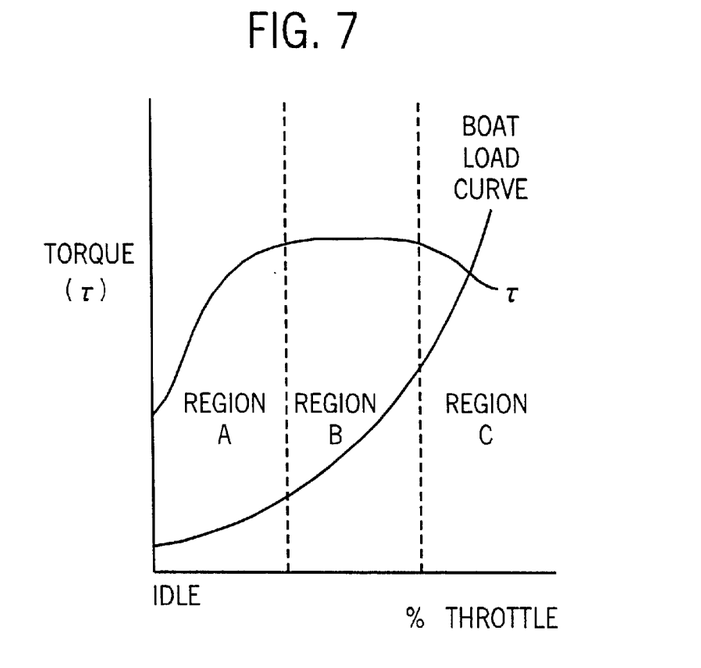
FIG. 7 is a graphical representation of torque versus percent throttle for an exemplary engine.

FIG. 7 illustrates an exemplary torque curve and boat load curve versus percent throttle for an exemplary engine utilizing the present technique. As graphically represented in FIG. 7, the torque curve has a relatively smooth transition through regions A, B and C. In regions A and C, all cylinders produce approximately equal torque, while in region B the cylinders operating in homogeneous combustion mode produce a greater torque than those operating in stratified combustion mode. However, the torque curve remains relatively smooth throughout the transition due to the gradual change from stratified to homogeneous combustion. Also, the homogeneous cylinders are specifically trimmed down immediately after the skip.

Figure 8:
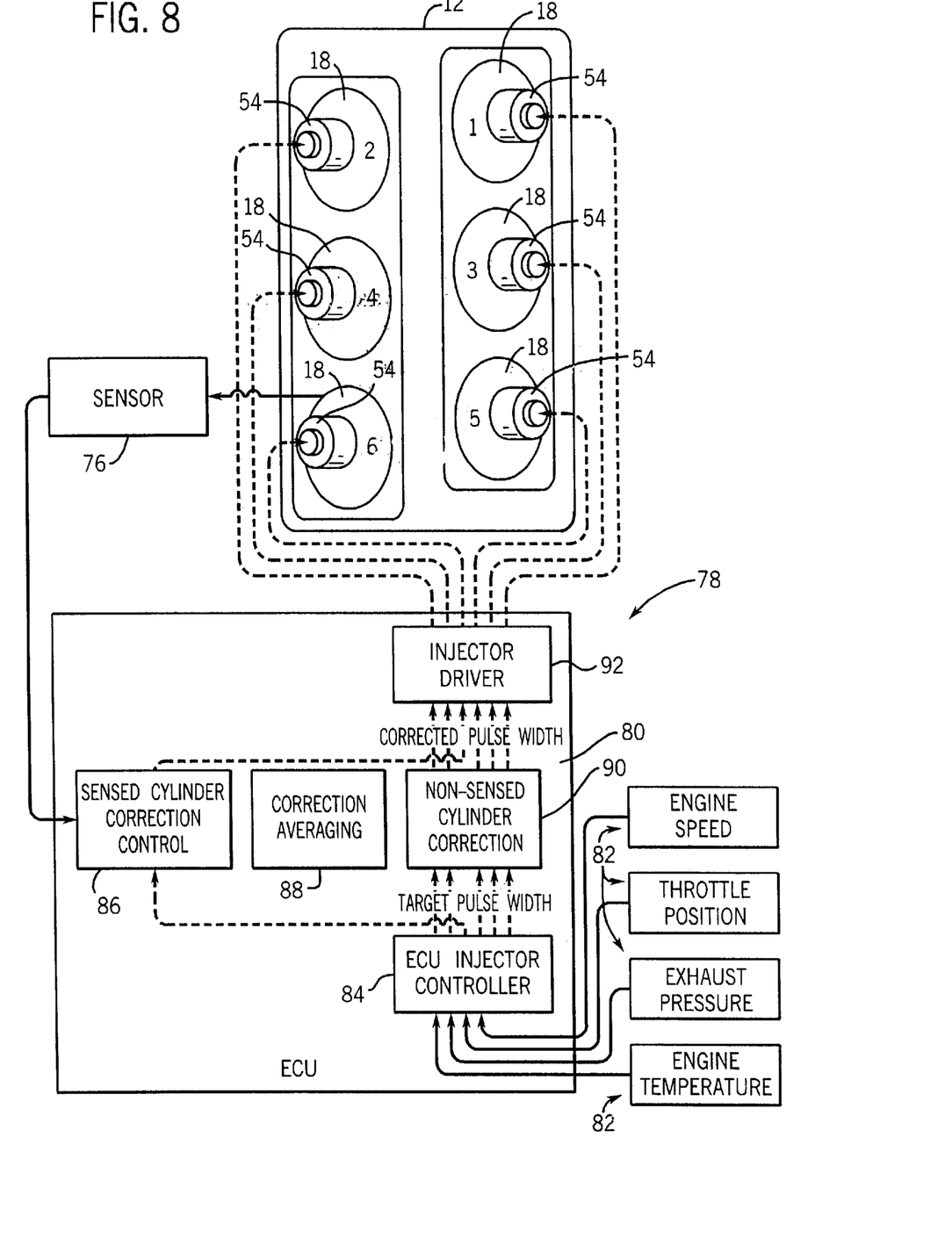
FIG. 8 is a schematic illustration of a control system connected to an exemplary engine, according to an exemplary embodiment of the present invention.

Referring generally to FIG. 8, a schematic representation of engine 12 is illustrated as coupled to a control system 78. The exemplary engine 12 includes six cylinders 18 each coupled to a fuel injector 54 designed to inject fuel directly into the corresponding cylinder 18.

An exemplary control system 78 includes an electronic control unit 80 coupled to a plurality of sensors 82 that sense such parameters as engine speed, throttle position, exhaust pressure and engine temperature. The output from sensors 82 is directed to an injector controller 84 in which one or more fuel maps are stored. Based on the input from sensors 82, injector controller 84 decides the appropriate quantity of fuel, e.g. gasoline, to inject into each of the cylinders 18 according to the fuel map.

In this particular embodiment, injector controller 84 continually varies the amount of fuel injected into the sensed cylinder to which combustion sensor 76 is coupled for determination of oxygen content in the exhaust gas. In the embodiment illustrated in FIG. 8, an individual cylinder 18 (labeled as cylinder #6) is connected to combustion sensor 76. Based on the output of combustion sensor 76, the fuel quantity injected at the sensed cylinder is either increased or decreased depending on whether the sensor indicates the fuel mixture to be lean or rich relative to a stoichiometric mixture. The periodic adjustment to the fuel quantity injected into the sensed cylinder (cylinder #6) is controlled by a sensed cylinder correction control 86.

As the stoichiometric mixture is continually determined at varying inputs from sensors 82, the amount of fuel actually injected to achieve the stoichiometric mixture is compared to the fuel map value stored at injector controller 84. The comparison permits determination of a correction factor based on the ratio of the actual fuel required for stoichiometric combustion versus the fuel map value established to achieve stoichiometric combustion.

Preferably, the correction factors are averaged over a predetermined number of engine cycles by a correction averaging module 88 of electronic control unit 80. The number of cycles over which the correction factors are averaged can vary according to engine and operating conditions (e.g., percent throttle, speed, and temperature), use, fuel and application. The average of this correction factor is then applied to the fuel map values for the non-sensed cylinders (e.g. cylinder #s 1, 2, 3, 4, and 5) via a non-sensed cylinder correction module 90. The altered or corrected fuel quantities are supplied to an injection driver 92 that adjusts the quantities injected into the non-sensed cylinders. Typical injectors 54 are solenoid-based injectors that can be controlled through adjustment of the pulse width to inject more or less fuel. Injector driver 92 increases the pulse width to inject a greater amount of fuel and decreases the pulse width to inject a lesser amount of fuel.

Even though the sensed cylinder is controlled to constantly determine stoichiometric combustion, the correction factor is applied to the non-sensed cylinders whether or not the desired operation is at a stoichiometric mixture. For example, at given inputs from sensors 82, the fuel map stored in injector controller 84 may be established to provide a richer mixture than stoichiometric. Even so, the correction factor is applied to the fuel map for the nonsensed cylinders. Thus, an inexpensive combustion sensor 76, e.g. a passive oxygen sensor, coupled to an individual cylinder can be used to improve operation of engine 12 even when the desired operation of the non-sensed cylinders is not at stoichiometric combustion mixtures.

In an exemplary operation, if the output of combustion sensor 76 indicates that the fuel map stored in injector controller 84 for stoichiometric operation is actually 5 percent lean of stoichiometric, then the fuel map may be adjusted by a correction factor of 5 percent. This correction factor is applied in the form of more fuel delivered to the non-sensed cylinders than indicated by the fuel map. Specifically, if the desired operating condition in the non-sensed cylinders is actually 10 percent rich of stoichiometric according to the stored map values for nonsensed cylinders, then the fuel map may be corrected by a percentage (e.g., 5–15 percent) to increase the quantity of fuel injected (e.g., 5–15 percent increase) to the non-sensed cylinders. Therefore, a target air-fuel ratio map may be set at conditions other than stoichiometric (e.g., 10 percent rich), and the cylinders may be adjusted accordingly. It should also be noted that the control unit 80 may be programmed to store the corrected fuel map for future application when under those particular operating conditions.

Figure 9:
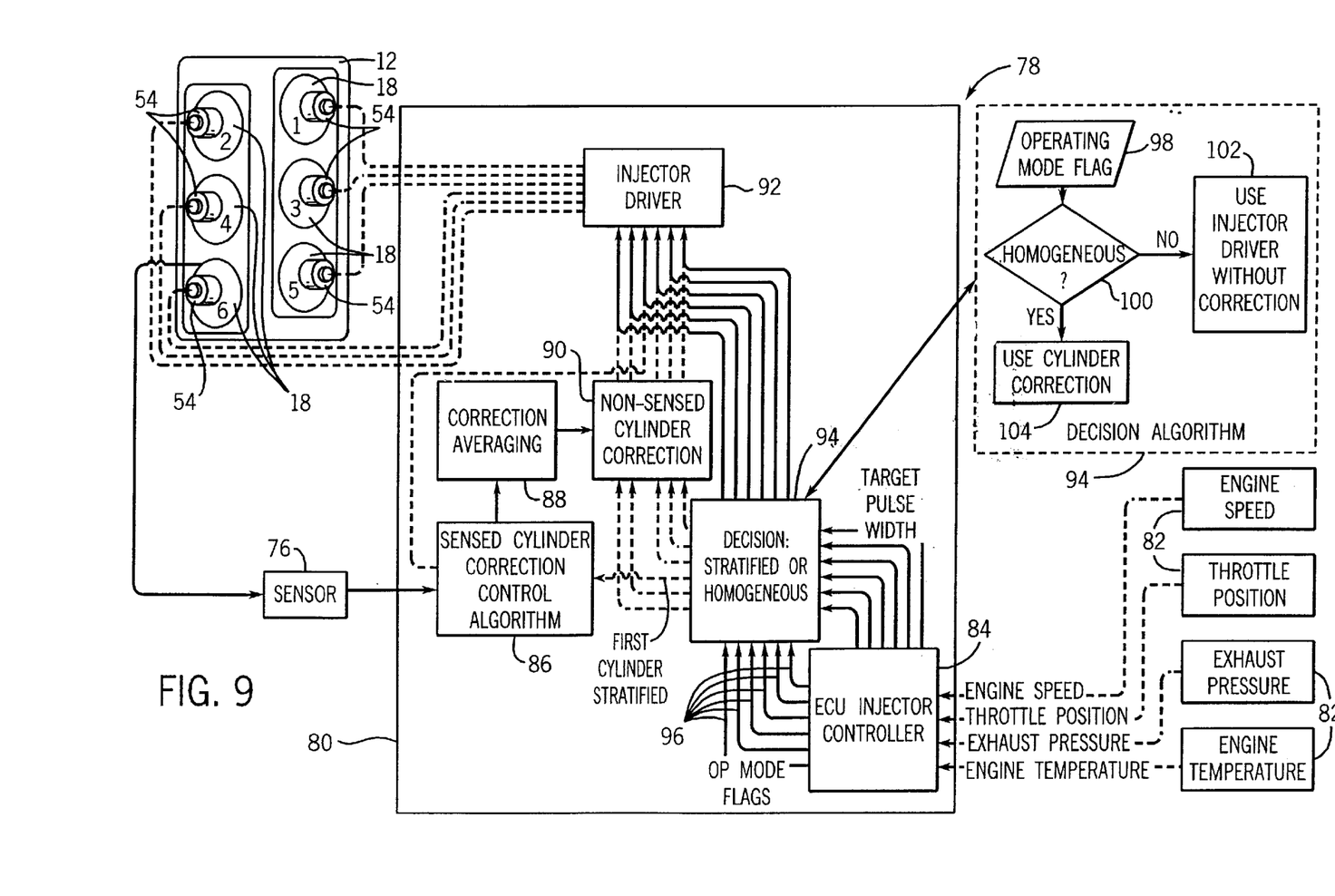
FIG. 9 is a schematic illustration similar to FIG. 8 but showing additional features of the control system.
Figure 10:
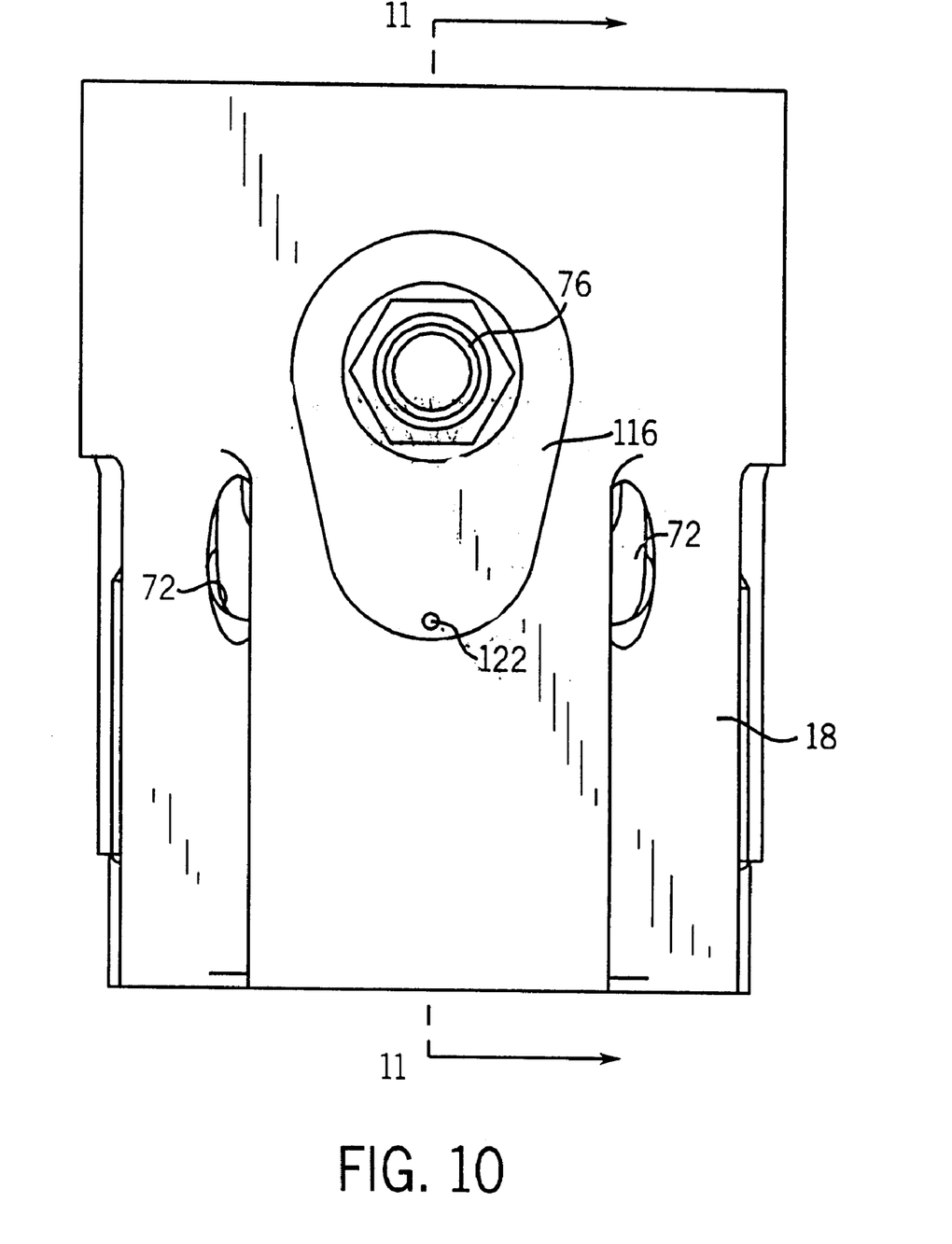
FIG. 10 is a partial side view of an engine cylinder to which a combustion condition sensor is mounted.

As illustrated in FIG. 9, it may be desirable to apply correction factors only if the engine is operating within a certain zone. For example, oxygen sensors can be used to more accurately determine air-fuel mixtures when a two-stroke is operated in homogeneous mode. Furthermore, if the control system is utilized with a skip strategy, as described above, it can be important to utilize the correction factor only for cylinders that have entered the homogeneous combustion mode. For such applications, a decision algorithm 94 is utilized by injector controller 84.

Injector controller 84 utilizes operational mode flags 96 (e.g., injection angle) to maintain track of whether a given cylinder is operating in a stratified combustion mode or a homogeneous combustion mode. According to decision algorithm 94, an operating mode flag for each cylinder is periodically polled or checked, as indicated by block 98. Based on the operating mode flag, a determination is made whether the particular cylinder is operating in homogeneous combustion mode, as indicated by block 100. If not, the injection driver is utilized according to the stored fuel map values without correction, as indicated by block 102. If, however, the homogeneous combustion mode has been attained, the correction factor is applied to that particular cylinder, as indicated by block 104. Further, the correction factor may be slowly phased in to smooth the transition.

Figure 11:
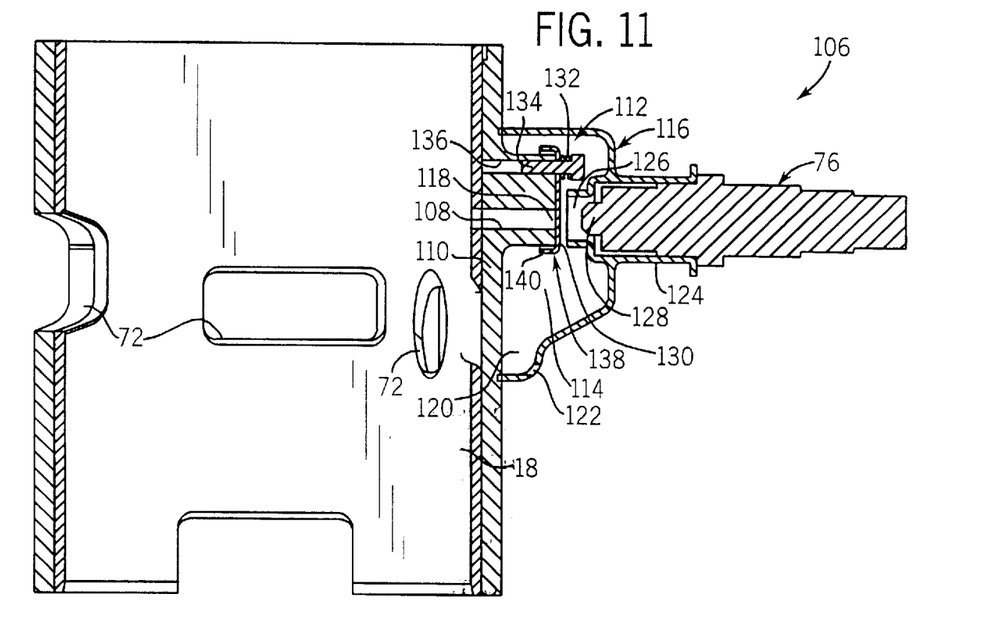
FIG. 11 is a cross-sectional view taken generally along line 11—11 of FIG. 10.
Figure 12:
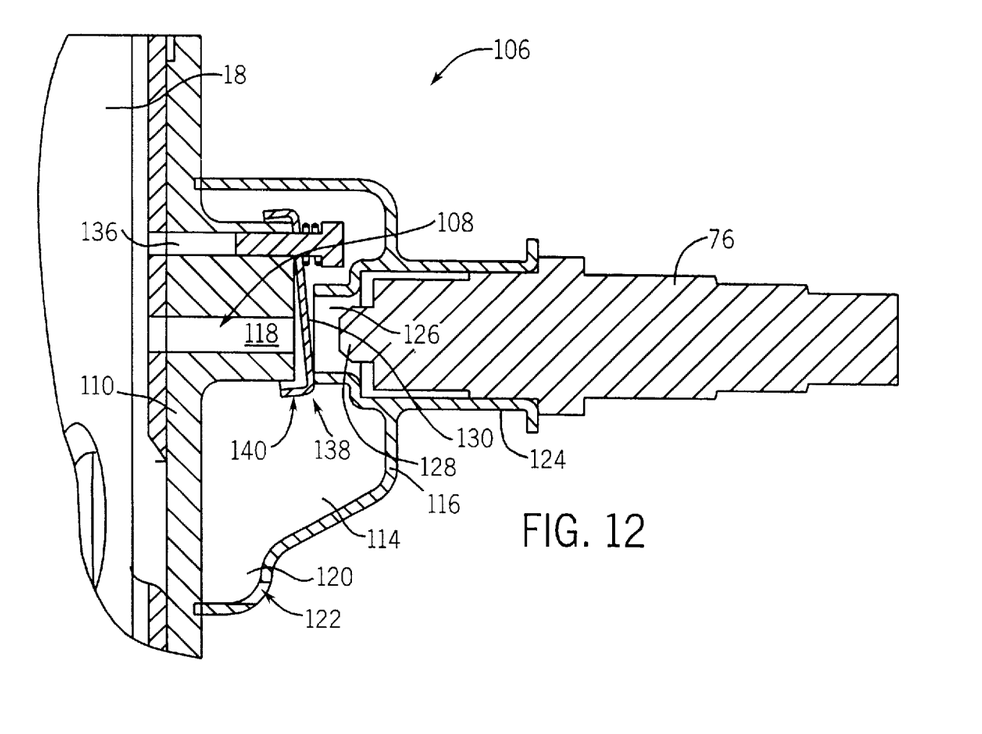
FIG. 12 is a cross-sectional view similar to FIG. 11 but showing the opening of a pressure valve to release exhaust gasses to the combustion condition sensor.

Referring generally to FIGS. 11–13, a preferred embodiment of a sensor assembly 106 includes sensor 76, such as a passive oxygen sensor, coupled to the sensed cylinder 18. Sensor assembly 106 includes a sampling passage 108 that extends through a cylinder wall 110 of cylinder 18. Sampling passage 108 is in fluid communication with the interior of cylinder 18 and is disposed at a location intermediate exhaust port or ports 72 and the top of cylinder 18 (generally defined as the top of piston 34 when piston 34 is disposed at top dead center within cylinder 18). External to cylinder 18, sampling passage 108 is blocked by a valve 112, such as a spring-loaded, pressure-release valve.

A sensor chamber 114 defined by a chamber wall 116 surrounds valve 112 and an outlet 118 of sampling passage 108. Sensor chamber 114 includes a liquid collection region 120 and a drain outlet 122 positioned to drain liquid that may collect in liquid collection region 120. Preferably, chamber wall 116 includes a mounting region 124 designed to receive sensor 76 by, for instance, threaded engagement. Mounting structure 124 includes an internal opening 126 that permits communication of a sensory tip 128 of sensor 76 with sensor chamber 114.

Valve 112 may comprise a variety of valves, such as reed valves or other types of spring-loaded valves. For example, in the illustrated embodiment, valve 112 utilizes a spring-loaded plate that is securely held over exit 118 of sampling passage 108 by a spring 132. Spring 132 is held against plate 130 by an adjuster 134, such as a threaded bolt that is inserted through the center of spring 132 and plate 130 for threaded engagement with a bore 136. Thus, the adjuster 134 can be tightened or loosened against spring 132 to hold spring-loaded plate 130 over exit 118 with greater or lesser force. This permits regulation of the amount of pressure in cylinder 18 that is required to open valve 112 to permit the escape of exhaust gas into sensor chamber 114, as illustrated in FIG. 12.

Additionally, sensor assembly 106 includes an outflow diverter 138 positioned to divert the flow of exhaust gas through sampling passage 108 such that the exhaust gas is not forced directly against sensor tip 128. The exhaust gas can contain fuel or oil droplets that detrimentally affect the operation of sensor 76 if permitted to contact sensor tip 128. In the illustrated embodiment, diverter 138 comprises a cupped portion 140 attached to spring plate 130 to divert the exhaust gas and any droplets or particles away from sensor tip 128. The liquid and particulate matter settles into liquid collection region 120 and is purged from sensor chamber 114 via drain outlet 122.

Drain outlet 122 can be arranged in a variety of configurations depending on the desired return flow. For example, the liquid collection region 120 can be placed in communication with an upper part of the exhaust port of the sensed cylinder or another cylinder; the liquid collection region may be placed in communication with the lower part of the exhaust system where the pressure waves will not create a backflow of exhaust gas into the chamber; the chamber may be placed in communication with a part of the exhaust system via another check valve that will only allow flow of gas out of the chamber and thus prevent any gas other than combustion gas from entering the chamber; the collection region may be placed in communication with the crankcase at the same cylinder; or the collection region may be placed in communication with the crankcase of another cylinder selected so that the crankcase pressure supports the purging of the sensor chamber.

It will be understood that the foregoing description is of preferred exemplary embodiments of this invention, and that the invention is not limited to the specific form shown. For example, the present invention potentially can be used with both two-stroke and four-stroke engines. A variety of fuel delivery systems can be used other than the direct fuel injection system described above. Additionally, although the engine control system and methodology have been described in the context of a marine engine, the invention may be utilized in a variety of other applications.

Also, the terms "stratified combustion" and "homogeneous combustion" should not be limited to pure stratified combustion and pure homogeneous combustion. Generally, there is a transition between pure stratified and pure homogeneous combustion. Therefore, the term "stratified combustion" refers both to pure stratified combustion and combustion which is more stratified than homogeneous, and the term "homogeneous combustion" refers to both pure homogeneous combustion and combustion which is more homogeneous than stratified. Furthermore, a variety of sensors and control systems or control system parameters can be incorporated into the design without departing from the scope of the present invention. These and other modifications may be made in the design and arrangement of the elements without departing from the scope of the invention as expressed in the appended claims.

What is claimed is:

1. A system for sensing a combustion condition in an internal combustion engine, comprising:
    an engine having a cylinder defined by a cylinder wall along which a piston moves in a reciprocal manner during operation;
    a sampling passage extending through the cylinder wall into fluid communication with the cylinder;
    a sensor positioned to sense a combustion condition based on an outflow through the sampling passage;
    an outflow diverter to limit direct exposure of the sensor to any undesirable liquids carried by the outflow; and
    a pressure release valve disposed to block flow through the sampling passage until a sufficient pressure level is reached within the cylinder.

2. The system as recited in claim 3, wherein the pressure release valve comprises a spring-loaded plate.

3. The system as recited in claim 4, wherein the outflow diverter comprises a cupped edge along the spring loaded plate to redirect the outflow.

4. The system as recited in claim 1, wherein the pressure release valve comprises a reed valve.

5. The system as recited in claim 1, further comprising a sensor chamber positioned about an outlet of the sampling passage, the sensor chamber being defined by a chamber wall having a mounting region to which the sensor is mounted for exposure to the sensor chamber.

6. The system as recited in claim 5, wherein the sensor chamber includes a liquid collection region and the chamber wall includes a drain outlet positioned to drain a liquid from the liquid collection region.

7. The system as recited in claim 1, wherein the sensor comprises an oxygen sensor.

8. The system as recited in claim 1, wherein the engine comprises a two-stroke engine.

9. The system as recited in claim 8, wherein the two-stroke engine includes an exhaust port and the sampling passage extends into communication with the cylinder between a top dead center position of the piston and the exhaust port.

10. The system as recited in claim 9, wherein the two-stroke engine is a direct injection two-stroke engine.

11. The system as recited in claim 10, wherein the two-stroke engine injects a fuel spray into the cylinder directly at a pair of spark plug electrodes.

12. The system as recited in claim 10, wherein the two-stroke engine is disposed in an outboard motor.

13. A system for sensing a combustion condition in an internal combustion engine, comprising:
    an engine having a cylinder defined by a cylinder wall along which a piston moves in a reciprocal manner during operation;
    a sampling passage extending through the cylinder wall into fluid communication with the cylinder;
    a sensor positioned to sense a combustion condition based on an outflow through the sampling passage; and
    a sensor chamber positioned about an outlet of the sampling passage, the sensor chamber being defined by a chamber wall having a drain outlet therethrough.

14. The system as recited in claim 13, further comprising a pressure release valve disposed to block flow through the sampling passage until a sufficient pressure level is reached within the cylinder.

15. The system as recited in claim 14, wherein the pressure release valve comprises a spring-loaded plate.

16. The system as recited in claim 15, wherein the outflow diverter to limit direct exposure of the sensor to any undesirable liquids carried by the outflow.

17. The system as recited in claim 16, wherein the outflow diverter comprises a cupped edge along the spring loaded plate to redirect the outflow.

18. The system as recited in claim 17, wherein the sensor chamber includes a mounting region to which the sensor is mounted.

19. The system as recited in claim 18, wherein the senor chamber includes a liquid collection region and the chamber wall includes a drain outlet positioned to drain a liquid from the liquid collection region.

20. The system as recited in claim 19, wherein the sensor comprises an oxygen sensor.

21. The system as recited in claim 19, wherein the sensor comprises a two-stroke engine.

22. The system as recited in claim 21, wherein the two-stroke engine is a direct injection two-stroke engine.

23. The system as recited in claim 22, wherein the two-stroke engine injects a fuel spray into the cylinder directly at a pair of spark plug electrodes.

24. A system for sensing a combustion condition in a watercraft having an internal combustion engine, comprising:
    a watercraft;
    an engine mounted in the watercraft, the engine having a cylinder defined by a cylinder wall along which a piston moves in a reciprocal manner during operation;
    a sampling passage extending through the cylinder wall into fluid communication with the cylinder;
    a sensor positioned to sense a combustion condition based on an outflow through the sampling passage; and
    an outflow diverter to limit direct exposure of the sensor to any undesirable liquids carried by the outflow.

25. The system as recited in claim 24, wherein the watercraft comprises a boat.

26. The system as recited in claim 25, wherein the engine is disposed in an outboard motor mounted to the boat.

27. The system as recited in claim 26, wherein the engine is a two-stroke engine.

28. The system as recited in claim 27, wherein the engine is a direct fuel injected engine.

29. The system as recited in claim 28, wherein the engine includes a spark plug having a pair of electrodes across which an ignition spark arcs, further wherein the fuel is injected directly at the pair of electrodes.

30. A system for sensing a combustion condition in a watercraft having an internal combustion engine, comprising:
    an engine having a cylinder defined by a cylinder wall along which a piston moves in a reciprocal manner during operation;
    a sampling passage extending through the cylinder wall into fluid communication with the cylinder;
    a sensor positioned to sense a combustion condition based on an outflow through the sampling passage; and
    a sensor chamber positioned about an outlet of the sampling passage, the sensor chamber being defined by a chamber wall having a drain outlet therethrough.

31. The system as recited in claim 30, wherein the watercraft comprises a boat.

32. The system as recited in claim 31, wherein the engine is disposed in an outboard motor mounted to the boat.

33. The system as recited in claim 32, wherein the engine is a two-stroke engine.

34. The system as recited in claim 33, wherein the engine is a direct fuel injected engine.

35. The system as recited in claim 33, wherein the engine includes a spark plug having a pair of electrodes across which an ignition spark arcs, further wherein the fuel is injected directly at the pair of electrodes.

36. A system for sensing a combustion condition in an internal combustion engine, the system comprising:

means for obtaining an exhaust gas sample from a cylinder of an engine;

means for sensing the exhaust gas sample to determine a combustion condition; and means for purging the exhaust gas sample without reintroducing it into the cylinder.

37. The system as recited in claim 36, wherein the means for obtaining includes a sampling passage and a valve disposed to block the sampling passage until a sufficient pressure occurs within the cylinder.

38. The system as recited in claim 37, wherein the means for obtaining includes a deflector to deflect the exhaust gas sample after it passes through the sampling passage.

39. The system as recited in claim 38, wherein the means for sensing comprises an oxygen sensor.

40. The system as recited in claim 39, wherein the means for purging includes a chamber for collecting the exhaust gas sample and an outlet through which the exhaust gas sample exits the chamber.

\* \* \* \* \*